US012638989B2

(12) United States Patent
Morano

(10) Patent No.: US 12,638,989 B2
(45) Date of Patent: May 26, 2026

(54) EPHEMERAL STORAGE VOLUMES FOR APPLICATION BUNDLES

(71) Applicant: Rakuten Symphony, Inc., Tokyo (JP)

(72) Inventor: Thomas Jay Morano, Scotts Valley, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/245,682

(22) PCT Filed: Nov. 10, 2022

(86) PCT No.: PCT/US2022/049557
§ 371 (c)(1),
(2) Date: Mar. 16, 2023

(87) PCT Pub. No.: WO2024/102133
PCT Pub. Date: May 16, 2024

(65) Prior Publication Data
US 2025/0272013 A1      Aug. 28, 2025

(51) Int. Cl.
*G06F 17/00*        (2019.01)
*G06F 3/06*         (2006.01)
(52) U.S. Cl.
CPC .......... *G06F 3/0632* (2013.01); *G06F 3/0604* (2013.01); *G06F 3/0679* (2013.01)
(58) Field of Classification Search
CPC .... G06F 3/0632; G06F 3/0604; G06F 3/0679; G06F 3/0631; G06F 3/067; G06F 9/5016; G06F 9/45558; G06F 2009/45579
See application file for complete search history.

(56) References Cited

U.S. PATENT DOCUMENTS

| | | | |
|---|---|---|---|
| 6,412,080 B1 | 6/2002 | Fleming | |
| 7,158,991 B2 | 1/2007 | Kekre | |
| 9,167,594 B2 | 10/2015 | Hsu | |
| 9,383,924 B1 * | 7/2016 | Fullbright | G06F 3/067 |
| 9,697,130 B2 * | 7/2017 | Karippara | G06F 9/50 |
| 9,940,377 B1 * | 4/2018 | Sait | G06F 3/065 |
| 10,073,656 B2 * | 9/2018 | Zhe Yang | G06F 3/0665 |
| 10,338,966 B2 | 7/2019 | Chen | |
| 10,346,095 B2 | 7/2019 | Joshi | |
| 10,860,444 B2 | 12/2020 | Natanzon | |
| 11,100,243 B2 | 8/2021 | Chenchev | |

(Continued)

OTHER PUBLICATIONS

Alberto Faria et al., Pods-as-Volumes: Effortlessly Integrating Storage Systems and Middleware into Kubernetes. In Proceedings of the Seventh International Workshop on Container Technologies and Container Clouds. Association for Computing Machinery, 1-6, <https://doi.org/10.1145/3493649.3493653>, Dec. 2021.*

(Continued)

*Primary Examiner* — Greta L Robinson
(74) *Attorney, Agent, or Firm* — David R. Stevens; Stevens Law Group

(57)        ABSTRACT

A method for creating a temporary storage volume for an application bundle in a cloud-network architecture framework. The method includes identifying an application comprising a role. The role is mapped to a pod comprising a container requesting, from a storage provider, an ephemeral storage volume. The method includes mounting the ephemeral storage volume to one or more of the pod or the container.

15 Claims, 16 Drawing Sheets

(56)                     References Cited

U.S. PATENT DOCUMENTS

| | | | |
|---|---|---|---|
| 11,281,492 B1 * | 3/2022 | Rebeja ................. | G06F 9/5077 |
| 11,675,503 B1 * | 6/2023 | Ekins .................... | G06F 3/0637 |
| | | | 711/163 |
| 11,789,651 B2 * | 10/2023 | Pabón .................. | G06F 3/0644 |
| | | | 711/154 |
| 12,254,206 B2 * | 3/2025 | Darji ..................... | G06F 9/5088 |
| 2014/0223096 A1 * | 8/2014 | Zhe Yang ............. | G06F 3/0619 |
| | | | 711/114 |
| 2018/0307537 A1 | 10/2018 | Chen et al. | |
| 2019/0310872 A1 | 10/2019 | Griffin et al. | |
| 2021/0117242 A1 | 4/2021 | Van De Groenendaal et al. | |
| 2021/0311765 A1 * | 10/2021 | Subramanian ...... | G06F 9/45558 |

OTHER PUBLICATIONS

Rion Dooley et al., Experiences Migrating the Agave Platform to A Kubernetes Native System on the Jetstream Cloud. In Practice and Experience in Advanced Research Computing 2021: Evolution Across All Dimensions. Association for Computing Machinery, Article 39, 1-4,< https://doi.org/10.1145/3437359.34> (Year: 2021).*
Yena Lee et al., Scheduler for Distributed and Collaborative Container Clusters based on Multi-Resource Metric. In Proceedings of the International Conference on Research in Adaptive and Convergent Systems. Association for Computing Machinery, 279-281. <https://doi.org/10.1145/3400286.3418281>, Oct. 2020.*

* cited by examiner

100

300

| Container 308a | Container 308b | Container 308n |
|---|---|---|
| Application 310a | Application 310b | Application 310n |
| Library 312a | Library 312b | Library 312n |

Container Runtime
306

Operating System
304

Hardware
302

400

| Storage Node 116 | Storage Node 116 | Compute Node 102 | Compute Node 102 |
|---|---|---|---|

Storage Manager 402

Orchestration Layer 404

Application Bundle 406

| Manifest 408 | Provisioning 410 | Configuration Parameters/ Functions 412 | Action Hooks 414 |
|---|---|---|---|

Role 416

Provisioning Constraints 418

Namespace 420

Configuration Parameters 422

Pod 424

Container 308

700

Storage Provider 614

Storage Node 116

Application 602

Pod 604

Container 606

/root

/mnt/data

/mnt/scratch

Volume A 608

Volume B 610

AEV 612

702

Namespace 607

Figure 8:
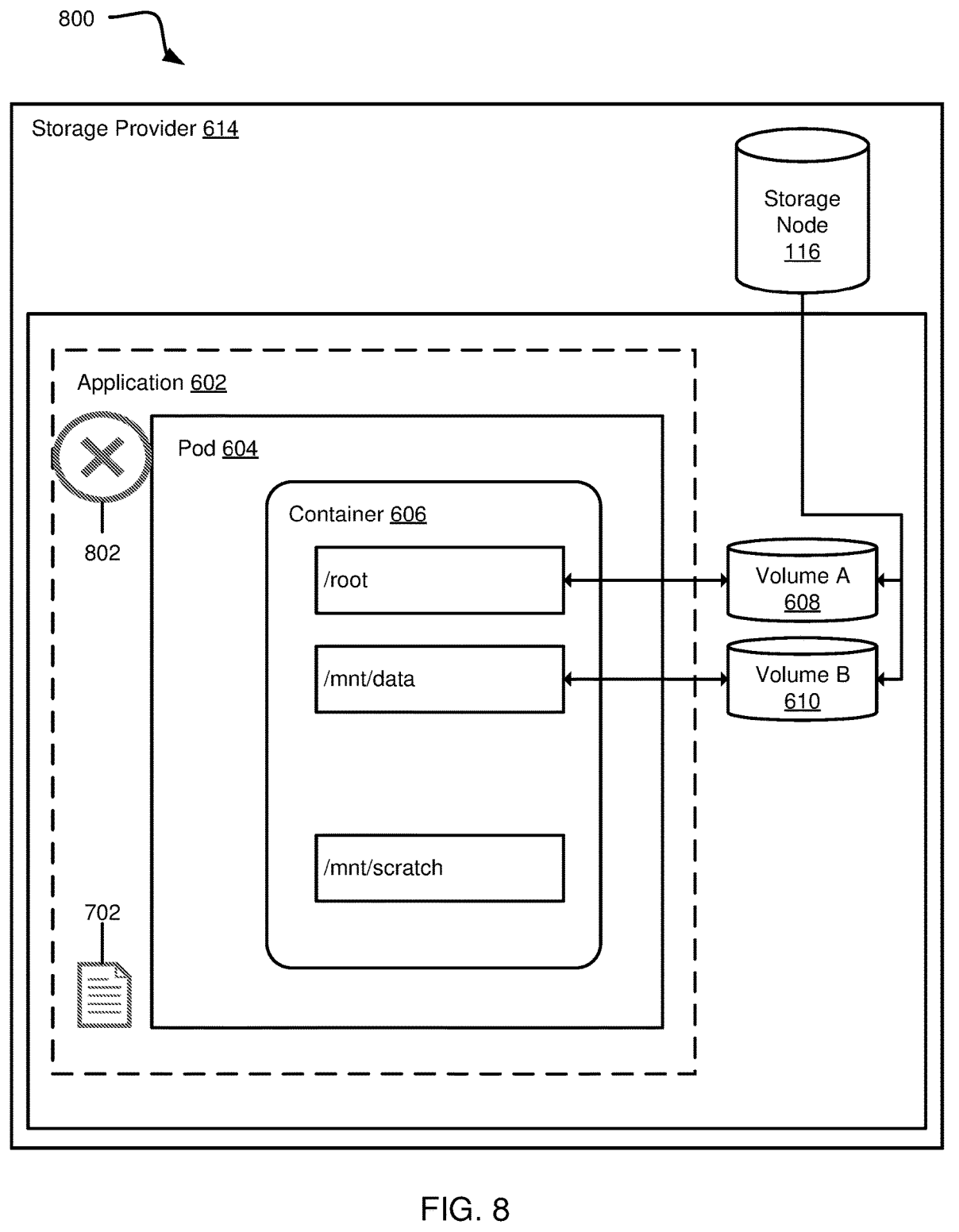

800

Storage Provider 614

Storage Node 116

Application 602

802

Pod 604

Container 606

/root

/mnt/data

/mnt/scratch

702

Volume A 608

Volume B 610

```
"ephemeral_storage": [
    {
        "size": 1073741824,
        "media": "HDD",
        "replication": 1,
        "faultdomain": "nofd",
        "path": "/mnt/scratch"
    }
]
```

1200 identifying an application comprising a role, wherein the role is mapped to a pod comprising a container;

requesting, from a storage provider, an ephemeral storage volume; and mounting the ephemeral storage volume to one or more of the pod or the container.

EPHEMERAL STORAGE VOLUMES FOR APPLICATION BUNDLES

TECHNICAL FIELD

The present disclosure relates generally to application bundle ephemeral storage volumes for distributed cloud-network architecture frameworks.

SUMMARY

An implementation of a software method for creating a temporary storage volume for an application bundle in a cloud-network architecture framework. The method may comprise identifying an application comprising a role, wherein the role is mapped to a pod comprising a container, requesting, from a storage provider, an ephemeral storage volume, and mounting the ephemeral storage volume to one or more of the pod or the container.

BACKGROUND

Cloud-network architecture frameworks, for example, Kubernetes, are regularly employed for managing complex applications in a containerized environment. They provide various facilities for managing container placement, resource allocation, service discovery, load balancing, scaling, etc.

Within such frameworks, on a cluster, a pod is the basic operational unit. Within a pod there may be one or more containers, which are grouped into pods and can be deployed as individual units or deployed under the control of various resource controllers. Users are able to decide how to define a set of related resources in various configurations of resource units. For managing the life cycle of a complex application made up of various resources, there is a lack of a proper construct to handle such complex applications in a time- and resource-efficient manner.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 8 is a schematic block diagram illustrating a deployed application in a powered-off state having its application ephemeral volume deleted;

DETAILED DESCRIPTION

The present disclosure generally relates to a framework for managing stateful applications deployed on a cluster. An application and its resources that together deliver a service to the end user may be collected into a single application bundle unit. A manifest file that may be included that maintains metadata on each of the application's associated resources in a configuration database. This facilitates life cycle management operations, such as snapshot, backup, restore, etc., that encompass all of an application's data and metadata, including the state of each resource.

Grouping an application and its resources into an application bundle allows users to define a new data organization structure that allows a user to manage resources and operations quickly and efficiently of complex applications. State changes may be pushed to one or more containers within those applications in a synchronized fashion, facilitating services not readily supported by traditional cloud-network architecture frameworks.

For stateful applications, use of ephemeral volumes with the application bundle structure allows for application bundles to efficiently handle any transient data needs with respect to their transactions and services. The creation and deletion of these temporary ephemeral volumes may be automated to allow application bundles to freely deploy and perform their respective operations then free that space for use by other applications.

Figure 1A:
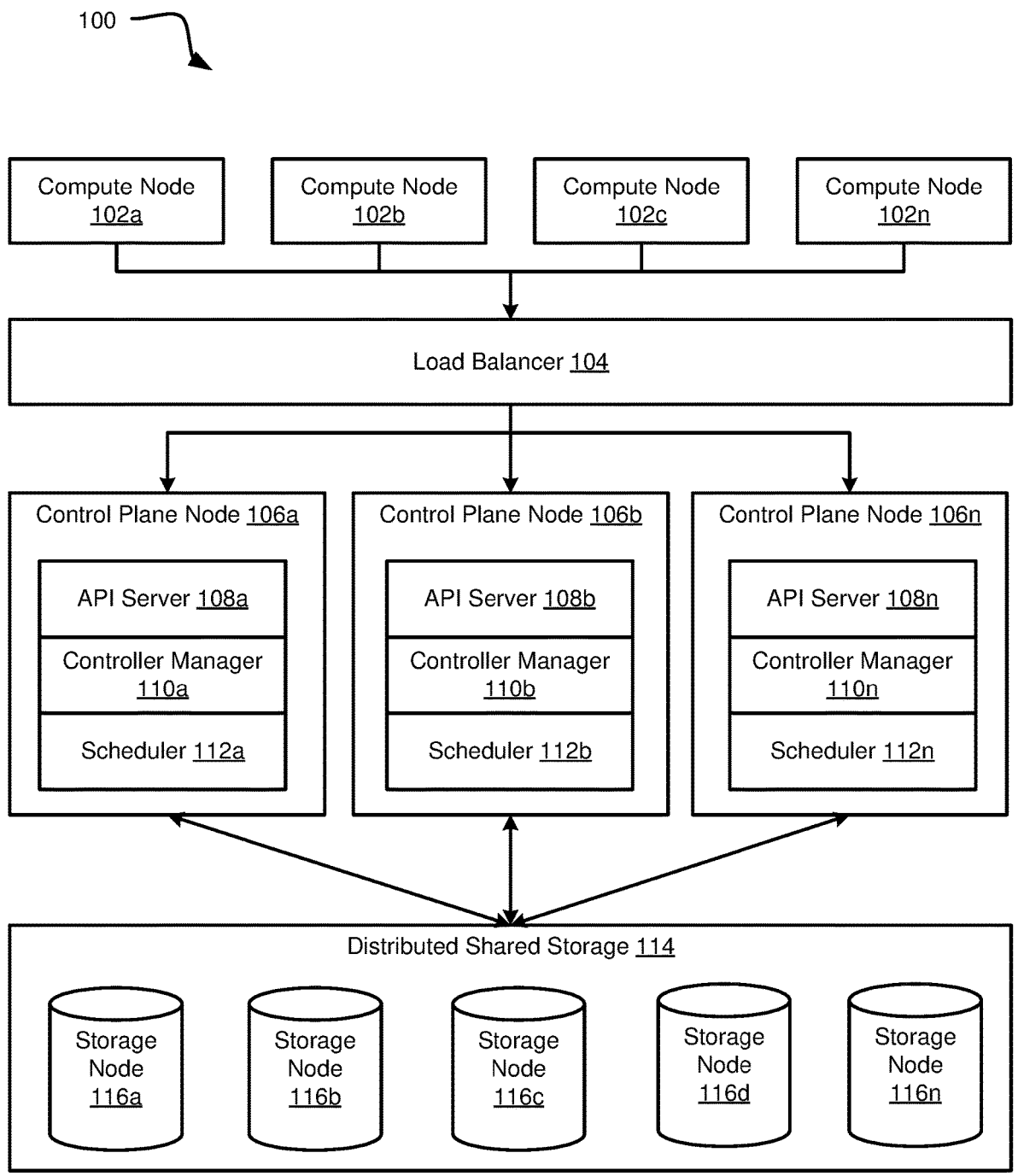
FIG. 1A is a schematic block diagram of a system for automated deployment, scaling, and management of containerized workloads and services, wherein the system draws on storage distributed across shared storage resources.
Figure 1B:
FIG. 1B is a schematic block diagram of a system for automated deployment, scaling, and management of containerized workloads and services, wherein the system draws on storage within a stacked storage cluster.

Referring now to the figures, FIGS. 1A and 1B are schematic illustrations of an example system 100 for automated deployment, scaling, and management of containerized workloads and services. The system 100 facilitates declarative configuration and automation through a distributed platform that orchestrates different compute nodes that may be controlled by central master nodes. The system 100 may include "n" number of compute nodes that can be distributed to handle pods.

The system 100 includes a plurality of compute nodes 102a, 102b, 102c, 102n (may collectively be referred to as compute nodes 102 as discussed herein) that are managed by a load balancer 104. The load balancer 104 assigns processing resources from the compute nodes 102 to one or more of the control plane nodes 106a, 106b, 106n (may collectively be referred to as control plane nodes 106 as discussed herein) based on need. In the example implementation illustrated in FIG. 1A, the control plane nodes 106 draw upon a distributed shared storage 114 resource comprising a plurality of storage nodes 116a, 116b 116c, 116d, 116n (may collectively be referred to as storage nodes 116 as discussed herein). In the example implementation illustrated in FIG. 1B, the control plane nodes 106 draw upon assigned storage nodes 116 within a stacked storage cluster 118.

The control planes 106 make global decisions about each cluster and detect and responds to cluster events, such as initiating a pod when a deployment replica field is unsatisfied. The control plane node 106 components may be run on any machine within a cluster. Each of the control plane nodes 106 includes an API server 108, a controller manager 110, and a scheduler 112.

The API server 108 functions as the front end of the control plane node 106 and exposes an Application Program Interface (API) to access the control plane node 106 and the compute and storage resources managed by the control plane node 106. The API server 108 communicates with the storage nodes 116 spread across different clusters. The API server 108 may be configured to scale horizontally, such that it scales by deploying additional instances. Multiple instances of the API server 108 may be run to balance traffic between those instances.

The controller manager 110 embeds core control loops associated with the system 100. The controller manager 110 watches the shared state of a cluster through the API server 108 and makes changes attempting to move the current state of the cluster toward a desired state. The controller manager 110 may manage one or more of a replication controller, endpoint controller, namespace controller, or service accounts controller.

The scheduler 112 watches for newly created pods without an assigned node, and then selects a node for those pods to run on. The scheduler 112 accounts for individual and collective resource requirements, hardware constraints, software constraints, policy constraints, affinity specifications, anti-affinity specifications, data locality, inter-workload interference, and deadlines.

The storage nodes 116 function as a distributed storage resources with backend service discovery and database. The storage nodes 116 may be distributed across different physical or virtual machines. The storage nodes 116 monitor changes in clusters and store state and configuration data that may be accessed by a control plane node 106 or a cluster. The storage nodes 116 allow the system 100 to support discovery service so that deployed applications can declare their availability for inclusion in service.

In some implementations, the storage nodes 116 are organized according to a key-value store configuration, although the system 100 is not limited to this configuration. The storage nodes 116 may create a database page for each record such that the database pages do not hamper other records while updating one. The storage nodes 116 may collectively maintain two or more copies of data stored across all clusters on distributed machines.

Figure 2:
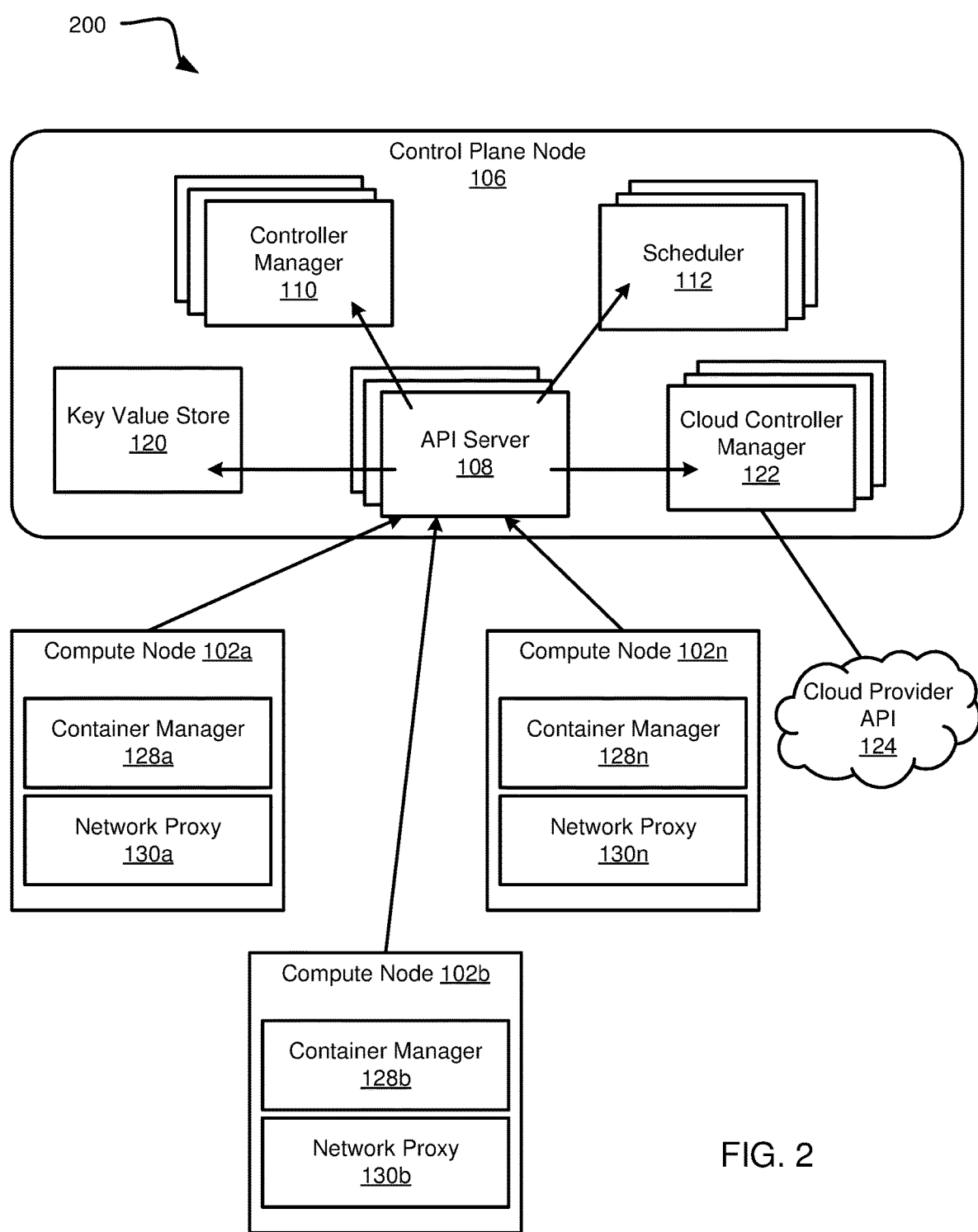
FIG. 2 is a schematic block diagram of a system for automated deployment, scaling, and management of containerized applications.

FIG. 2 is a schematic illustration of a cluster 200 for automating deployment, scaling, and management of containerized applications. The cluster 200 illustrated in FIG. 2 is implemented within the systems 100 illustrated in FIGS. 1A-1B, such that the control plane node 106 communicates with compute nodes 102 and storage nodes 116 as shown in FIGS. 1A-1B. The cluster 200 groups containers that make up an application into logical units for management and discovery.

The cluster 200 deploys a cluster of worker machines, identified as compute nodes 102a, 102b, 102n. The compute nodes 102a-102n run containerized applications, and each cluster has at least one node. The compute nodes 102a-102n host pods that are components of an application workload. The compute nodes 102a-102n may be implemented as virtual or physical machines, depending on the cluster. The cluster 200 includes a control plane node 106 that manages compute nodes 102a-102n and pods within a cluster. In a production environment, the control plane node 106 typically manages multiple computers and a cluster runs multiple nodes. This provides fault tolerance and high availability.

The key value store 120 is a consistent and available key value store used as a backing store for cluster data. The controller manager 110 manages and runs controller processes. Logically, each controller is a separate process, but to reduce complexity in the cluster 200, all controller processes are compiled into a single binary and run in a single process. The controller manager 110 may include one or more of a node controller, job controller, endpoint slice controller, or service account controller.

The cloud controller manager 122 embeds cloud-specific control logic. The cloud controller manager 122 enables clustering into a cloud provider API 124 and separates components that interact with the cloud platform from components that only interact with the cluster. The cloud controller manager 122 may combine several logically independent control loops into a single binary that runs as a single process. The cloud controller manager 122 may be scaled horizontally to improve performance or help tolerate failures.

The control plane node 106 manages any number of compute nodes 126. In the example implementation illustrated in FIG. 2, the control plane node 106 is managing three nodes, including a first node 126a, a second node 126b, and an nth node 126n (which may collectively be referred to as compute nodes 126 as discussed herein). The compute nodes 126 each include a container manager 128 and a network proxy 130.

The container manager 128 is an agent that runs on each compute node 126 within the cluster managed by the control plane node 106. The container manager 128 ensures that containers are running in a pod. The container manager 128 may take a set of specifications for the pod that are provided through various mechanisms, and then ensure those specifications are running and healthy.

The network proxy 130 runs on each compute node 126 within the cluster managed by the control plane node 106. The network proxy 130 maintains network rules on the compute nodes 126 and allows network communication to the pods from network sessions inside or outside the cluster.

Figure 3:
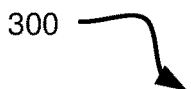
FIG. 3 is a schematic block diagram illustrating a system for managing containerized workloads and services.

FIG. 3 is a schematic diagram illustrating a system 300 for managing containerized workloads and services. The system 300 includes hardware 302 that supports an operating system 304 and further includes a container runtime 306, which refers to the software responsible for running containers 308. The hardware 302 provides processing and storage resources for a plurality of containers 308*a*, 308*b*, 308*n* that each run an application 310 based on a library 312. The system 300 discussed in connection with FIG. 3 is implemented within the systems 100, 200 described in connection with FIGS. 1A-1B and 2.

The containers 308 function similar to a virtual machine but have relaxed isolation properties and share an operating system 304 across multiple applications 310. Therefore, the containers 308 are considered lightweight. Similar to a virtual machine, a container has its own file systems, share of CPU, memory, process space, and so forth. The containers 308 are decoupled from the underlying instruction and are portable across clouds and operating system distributions.

Containers 308 are repeatable and may decouple applications from underlying host infrastructure. This makes deployment easier in different cloud or OS environments. A container image is a ready-to-run software package, containing everything needed to run an application, including the code and any runtime it requires, application and system libraries, and default values for essential settings. By design, a container 308 is immutable such that the code of a container 308 cannot be changed after the container 308 begins running.

The containers 308 enable certain benefits within the system. Specifically, the containers 308 enable agile application creation and deployment with increased ease and efficiency of container image creation when compared to virtual machine image use. Additionally, the containers 308 enable continuous development, integration, and deployment by providing for reliable and frequent container image build and deployment with efficient rollbacks due to image immutability. The containers 308 enable separation of development and operations by creating an application container at release time rather than deployment time, thereby decoupling applications from infrastructure. The containers 308 increase observability at the operating system-level, and also regarding application health and other signals. The containers 308 enable environmental consistency across development, testing, and production, such that the applications 310 run the same on a laptop as they do in the cloud. Additionally, the containers 308 enable improved resource isolation with predictable application 310 performance. The containers 308 further enable improved resource utilization with high efficiency and density.

The containers 308 enable application-centric management and raise the level of abstraction from running an operating system 304 on virtual hardware to running an application 310 on an operating system 304 using logical resources. The containers 304 are loosely coupled, distributed, elastic, liberated micro-services. Thus, the applications 310 are broken into smaller, independent pieces and can be deployed and managed dynamically, rather than a monolithic stack running on a single-purpose machine.

The containers 308 may include any container technology known in the art such as DOCKER, LXC, LCS, KVM, or the like. In a particular application bundle 406, there may be containers 308 of multiple distinct types in order to take advantage of a particular container's capabilities to execute a particular role 416. For example, one role 416 of an application bundle 406 may execute a DOCKER container 308 and another role 416 of the same application bundle 406 may execute an LCS container 308.

The system 300 allows users to bundle and run applications 310. In a production environment, users may manage containers 308 and run the applications to ensure there is no downtime. For example, if a singular container 308 goes down, another container 308 will start. This is managed by the control plane nodes 106, which oversee scaling and failover for the applications 310.

Figure 4:
FIG. 4 is a schematic block diagram illustrating a system for implementing an application-orchestration approach to data management and allocation of processing resources.

FIG. 4 is a schematic diagram of an example system 400 implementing an application-orchestration approach to data management and the allocation of processing resources. The system 400 includes an orchestration layer 404 that implements an application bundle 406 including one or more roles 416. The role 416 may include a standalone application, such as a database, webserver, blogging application, or any other application. Examples of roles 416 include the roles used to implement multi-role applications such as CASSANDRA, HADOOP, SPARK, DRUID, SQL database, ORACLE database, MONGODB database, WORDPRESS, and the like. For example, in HADOOP, roles 416 may include one or more of a named node, data node, zookeeper, and AMBARI server.

The orchestration layer 404 implements an application bundle 406 by defining roles 416 and relationships between roles 416. The orchestration layer 404 may execute on a computing device of a distributed computing system (see, e.g., the systems illustrated in FIGS. 1A-1B and 2-3), such as on a compute node 102, storage node 116, a computing device executing the functions of the control plane node 106, or some other computing device. Accordingly, actions performed by the orchestration layer 404 may be interpreted as being performed by the computing device executing the orchestration layer 404.

The application bundle 406 includes a manifest 408 and artifacts describing an application. The application bundle 406 itself does not take any actions. When the application bundle 406 is deployed by compute resources, the application bundle 406 is then referred to as a "bundle application." This is discussed in connection with FIG. 6, which illustrates deployment of the application bundle 406 to generate a bundle application 606 comprising one or more pods 424 and containers 308 run on compute nodes 102 within a cluster 200.

The application bundle 406 includes a manifest 408 that defines the roles 416 of the application bundle 406, which may include identifiers of roles 416 and possibly a number of instances for each role 416 identified. The manifest 408 defines dynamic functions based on the number of instances of a particular role 416, which may grow or shrink in real-time based on usage. The orchestration layer 404 creates or removes instances for a role 416 as described below as indicated by usage and one or more functions for that role 416. The manifest 408 defines a topology of the application bundle 406, which includes the relationships between roles 416, such as services of a role that are accessed by another role.

The application bundle 406 includes a provisioning component 410. The provisioning component 410 defines the resources of storage nodes 116 and compute nodes 102 required to implement the application bundle 406. The provisioning component 410 defines the resources for the application bundle 406 as a whole or for individual roles 416. The resources may include a number of processors (e.g., processing cores), an amount of memory (e.g., RAM (random access memory), an amount of storage (e.g., GB (gigabytes) on an HDD (Hard Disk Drive) or SSD (Solid State Drive)), and so forth. As described below, these resources may be provisioned in a virtualized manner such that the application bundle 406 and individual roles 416 are not informed of the actual location or processing and storage resources and are relieved from any responsibility for managing such resources.

The provisioning component 410 implements static specification of resources and may also implement dynamic provisioning functions that invoke allocation of resources in response to usage of the application bundle 406. For example, as a database fills up, additional storage volumes may be allocated. As usage of an application bundle 406 increases, additional processing cores and memory may be allocated to reduce latency.

The application bundle 406 may include configuration parameters 412. The configuration parameters include variables and settings for each role 416 of the application bundle 406. The developer of the role defines the configuration parameters 416 and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function.

The application bundle 406 may further include action hooks 414 for various life cycle actions that may be taken with respect to the application bundle 406 and/or particular roles 416 of the application bundle 406. Actions may include some or all of stopping, starting, restarting, taking snapshots, cloning, and rolling back to a prior snapshot. For each action, one or more action hooks 414 may be defined. An action hook 414 is a programmable routine that is executed by the orchestration layer 404 when the corresponding action is invoked. The action hook 414 may specify a script of commands or configuration parameters input to one or more roles 416 in a particular order. The action hooks 414 for an action may include a pre-action hook (executed prior to implementing an action), an action hook (executed to actually implement the action), and a post action hook (executed following implementation of the action).

The application bundle 406 defines one or more roles 416. Each role 416 may include one or more provisioning constraints. As noted above, the application bundle 406 and the roles 416 are not aware of the underlying storage nodes 106 and compute nodes 116 inasmuch as these are virtualized by the storage manager 402 and orchestration layer 404. Accordingly, any constraints on allocation of hardware resources may be included in the provisioning constraints 410. As described in greater detail below, this may include constraints to create separate fault domains in order to implement redundancy and constraints on latency.

The role 416 references the namespace 420 defined by the application bundle 406. All pods 424 associated with the application bundle 406 are deployed in the same namespace 420. The namespace 420 includes deployed resources like pods, services, configmaps, daemonsets, and others specified by the role 416. In particular, interfaces and services exposed by a role may be included in the namespace 420. The namespace 420 may be referenced through the orchestration layer 404 by an addressing scheme, e.g., <Bundle ID>.<Role ID>.<Name>. In some embodiments, references to the namespace 420 of another role 416 may be formatted and processed according to the JINJA template engine or some other syntax. Accordingly, each role 416 may access the resources in the namespace 420 in order to implement a complex application topology.

A role 416 may further include various configuration parameters 422 defined by the role, i.e., as defined by the developer that created the executable for the role 416. As noted above, these parameters may be set by the orchestration layer 404 according to the static or dynamic configuration parameters 422. Configuration parameters 422 may also be referenced in the namespace 420 and be accessible (for reading and/or writing) by other roles 416.

Each role 416 within the application bundle 406 maps to a pod 424. Each of the one or more pods 424 includes one or more containers 308. Each resource allocated to the application bundle 406 is mapped to the same namespace 420.

The pods 424 are the smallest deployable units of computing that may be created and managed in the systems described herein. The pods 424 constitute groups of one or more containers 308, with shared storage and network resources, and a specification of how to run the containers 308. The pods' 502 containers are co-located and co-scheduled and run in a shared context. The pods 424 are modeled on an application-specific "logical host," i.e., the pods 424 include one or more application containers 308 that are relatively tightly coupled. In non-cloud contexts, application bundles 406 executed on the same physical or virtual machine are analogous to cloud applications executed on the same logical host.

The pods 424 are designed to support multiple cooperating processes (as containers 308) that form a cohesive unit of service. The containers 308 in a pod 424 are co-located and co-scheduled on the same physical or virtual machine in the cluster. The containers 308 can share resources and dependencies, communicate with one another, and coordinate when and how they are terminated. The pods 424 may be designed as relatively ephemeral, disposable entities. When a pod 424 is created, the new pod 424 is schedule to run on a node in the cluster. The pod 424 remains on that node until the pod 424 finishes executing, and then the pod 424 is deleted, evicted for lack of resources, or the node fails.

In some implementations, the shared context of a pod 424 is a set of Linux® namespaces, cgroups, and potentially other facets of isolation, which are the same components of a container 308. The pods 424 are similar to a set of containers 308 with shared filesystem volumes.

The pods 424 can specify a set of shared storage volumes. All containers 308 in the pod 424 can access the shared volumes, which allows those containers 308 to share data. Volumes allow persistent data in a pod 424 to survive in case one of the containers 308 within needs to be restarted.

In some cases, each pod 424 is assigned a unique IP address for each address family. Every container 308 in a pod 424 shares the network namespace, including the IP address and network ports. Inside a pod 424, the containers that belong to the pod 424 can communicate with one another using localhost. When containers 308 in a pod 424 communicate with entities outside the pod 424, they must coordinate how they use the shared network resources. Within a pod 424, containers share an IP address and port space, and can find each other via localhost. The containers 308 in a pod 424 can also communicate with each other using standard inter-process communications.

Figure 5:
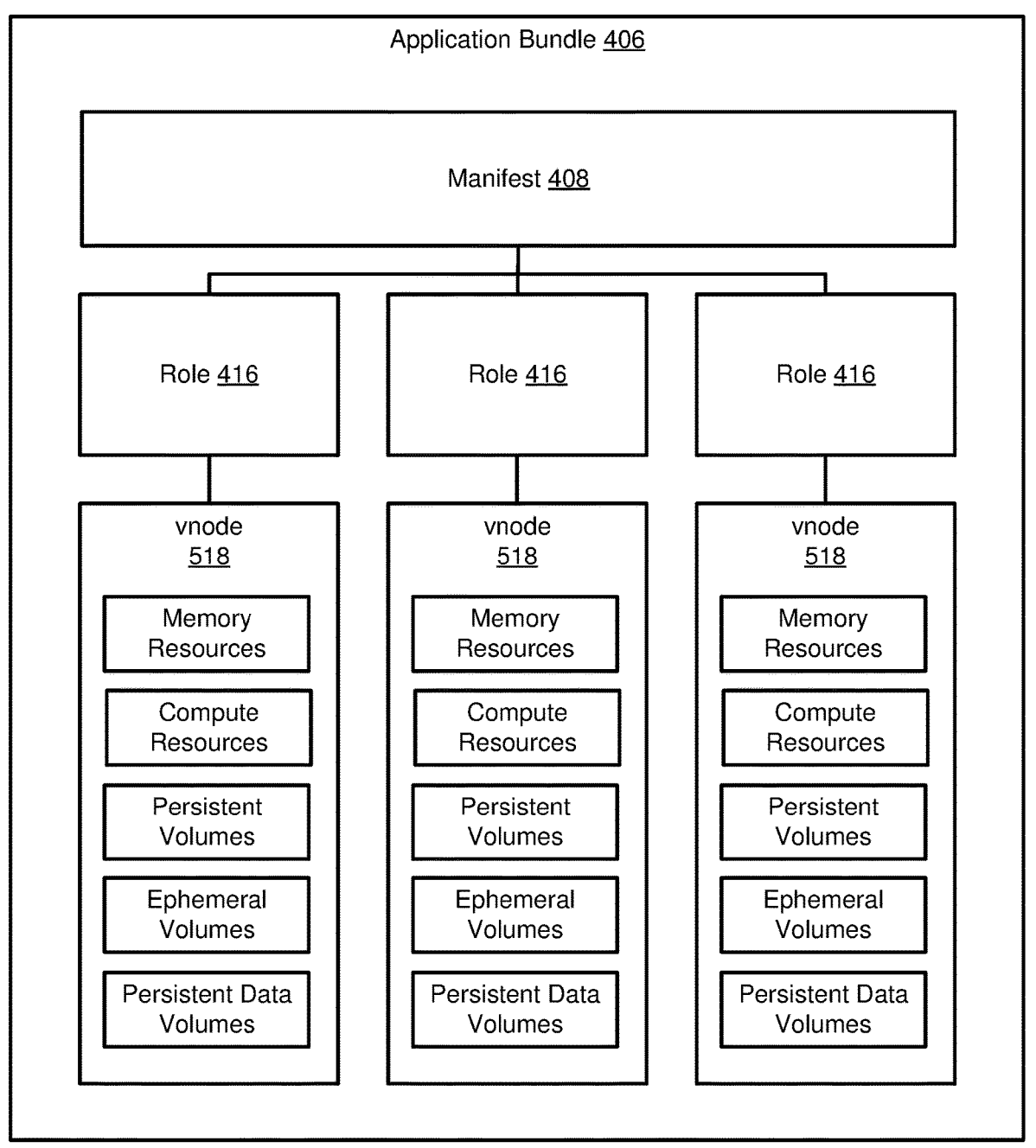
FIG. 5 is a schematic block diagram illustrating an example application bundle.

FIG. 5 is a schematic illustrations of an example application bundle 406 that may be executed by the systems described herein. The application bundle 406 is a collection of artifacts required to deploy and manage an application. The application bundle 406 includes one or more application container images referenced within a manifest 408 file that describes the components of its corresponding application bundle 406. The manifest 408 file further defines the necessary dependencies between services, resource requirements, affinity and non-affinity rules, and custom actions required for application management. As a result, a user may view the application bundle 406 as the starting point for creating an application within the systems described herein.

The application bundle 406 includes the manifest 408 file, and further optionally includes one or more of an icons directory, scripts directory, and source directory. The manifest 408 file may be implemented as a YAML file that acts as the blueprint for an application. The manifest 408 file describes the application components, dependencies, resource requirements, hookscripts, execution order, and so forth for the application. The icons directory includes application icons, and if no icon is provided, then a default image may be associated with the application bundle 406. The scripts directory includes scripts that need to be run during different stages of the application deployment. The scripts directory additionally includes lifecycle management for the application.

The example application bundle 406 illustrated in FIG. 5 includes a plurality of roles 416, but it should be appreciated that the application bundle 406 may have any number of roles 416, including one or more roles 416 as needed depending on the implementation. Each role 416 defines one or more vnodes 518. Each vnode 518 specifies container 308 resources for the corresponding role 416. The container resources include one or more of memory resources, compute resources, persistent volumes, persistent data volumes, and ephemeral data volumes. When the application bundle 406 is deployed in a cluster such as the cluster 200 illustrated in FIG. 2, each role 416 maps to a pod 424 and each vnode 518 maps to a container 308.

The manifest 408 file has several attributes that can be used to manipulate aspects of a container 308, including compute node 102 resources and storage node 116 resources allocated to the containers 308, which containers 308 are spawned, and so forth. The application bundle 406 enables user to specify image and runtime engine options for each role 416. These options may include, for example name (name of the image), version (version of the image), and engine (type of runtime such as DOCKER, KVM, IXC, and so forth).

The manifest 408 file allocates compute resources such as memory, CPU, hugepages, GPU, and so forth, at the container 308 level. A user may specify the type of CPUs that should be picked, and may further specify options such as Non-Isolated, Isolated-Shared, and Isolated-Dedication. The Non-Isolated option indicates that the physical CPUs to be used for a deployment of the application bundle 406 should be from a non-isolated pool of CPUs on a host. The Isolated-Shared option indicates that the physical CPUs to be used for a deployment of the application bundle 406 should be from an isolated pool of CPUS on the host. With this option, even though the allocated CPUs are isolated from kernel processes, they can still be utilized by other application deployments. The Isolated-Dedicated option indicates that the physical CPUs to be used for a deployment of the application bundle 406 should be from an isolated pool of CPUs on the host. With this option, the allocated CPUs are isolated from kernel processes and other application deployments. The manifest 408 file further allocates storage resources at the container 308 level.

Figure 6:
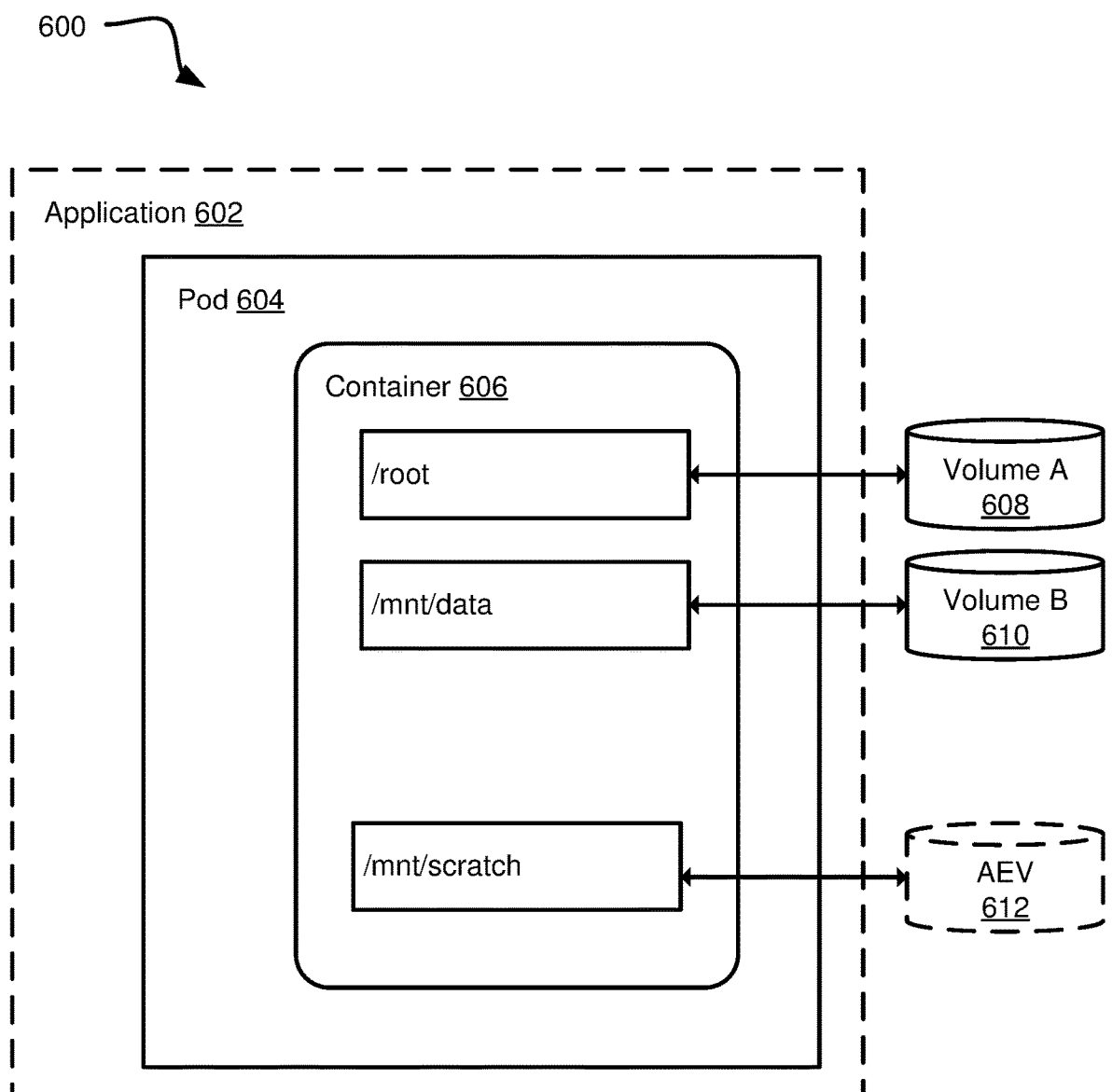
FIG. 6 is a schematic block diagram illustrating an overview of an application with mounted persistent and ephemeral storage.
Figure 7:
FIG. 7 is a schematic block diagram illustrating a deployed application mounting an application ephemeral volume as defined by a manifest file.

FIG. 6 shows a schematic diagram of an overview 600 of an application having an application ephemeral volume (AEV) mounted thereon. An application 602 may comprise one or more pods 604 comprising one or more containers 606. An application may mount one or more storage volumes 608, 610, 612 to mount points on a container. In some implementations, application bundles may contain some or all specifications and resources necessary for deployment, as seen in FIG. 7. FIG. 7 shows an overview 700 of an application having been deployed. An application's specifications may be contained in a manifest file 702 containing, among other configurations, the storage volume requirements necessitated by the application. Application bundles may be suited for complex workloads such as, as non-limiting examples, Cloudera, Oracle RAC, Splunk, SAP HANA, or other comparable software. An application bundle may contain some or all resources a complex application may require to deploy the complex application to a cluster. These resources may include things like a list of services offered by a particular application. As a non-limiting example, services offered by MongoDB include ConfigServer, QueryRouter, Shards, ReplicaSets. Resources may further include specification for which image to pull for each service. Images may be vendor published images in some implementations, or in others they can be custom, locally hosted images. Optionally, application specific placement constraints may also be specified. For example, anti/affinity policies for one or more services.

The manifest file 702 may act as a blueprint for the application bundle by, for example, describing application components, dependencies, resource requirements, scripts, execution order, and other considerations for deploying an application. Application configuration information may, in some implementations, be contained in a YAML file, while in other implementations the manifest file may be another objection notation or markup language format, such as XML or JSON. The manifest file, icon file, and any other application scripts may be packaged into a single archive file, such as a tar file, or other combined file type, and uploaded to a cluster.

Figure 1B:
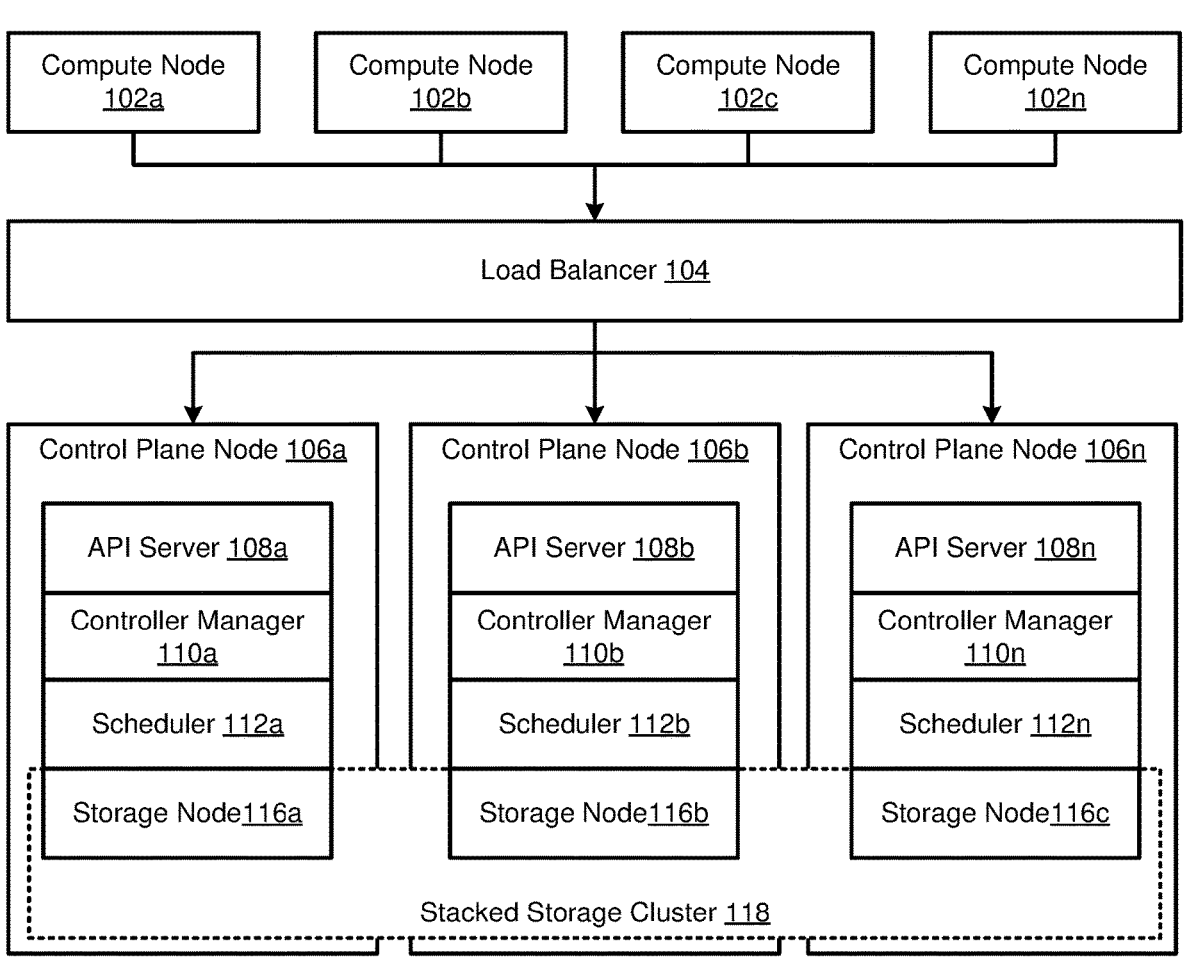

Application ephemeral volumes 612 may be added to applications as other storage volumes through a storage node 116, as previously shown in FIG. 1. When adding an application ephemeral volume to an application bundle, a user may add an entry describing the volume to the application bundle's manifest file. The application ephemeral volume entry may contain settings or configurations for various attributes defining characteristics of the storage the application needs, including media type, replication factor, and fault domain, and other characteristics. Other configuration entries may include the size of the volume, which media type to allocate storage from, if the volume should be protected using replication, if the storage should come from a specific set of disks, or if compute and storage resources should be co-located on the same node (so called compute-storage affinity), and other characteristics.

Referring again to FIG. 7, once provisioned, an ephemeral storage volume 612 may be mounted to the application 602. The storage node 116 may be utilized to create, from one or more disks (not shown), data blocks for the storage volume. Storage volumes may be persistent storage volumes, as in exemplary Volumes A 608 and B 610 shown. Persistent volumes may be created and persist throughout the length of the application, even if power is lost or the application is shutdown. Ephemeral storage volumes instead may provide non-persistent, temporary storage for use by those applications 602, as AEVs. Persistent volumes may have a life span equal to that of the application (created when the application is deployed and destroyed when the application is removed), while ephemeral volumes may exist when an application is running (created when the application is deployed, or recreated following a reboot, planned or otherwise) and be destroyed when the application is destroyed. In the event an application mount to which a storage volume is mounted is destroyed or the application is rebooted, data from the application bundle ephemeral volume may not be persisted or retained elsewhere on the cluster.

Ephemeral storage volumes may be functionally equivalent to persistent volumes, providing a file system storing data for programs or services in an application container for as long as needed while the application is running. Applications 602 may access and share files and folders in the ephemeral storage volume's file system, comparable to how files would be accessed if the files were in a local directory. Applications 602, in some implementations, may use both ephemeral storage and persistent storage volumes. Storage volumes may be shared by multiple containers within applications in some implementations, while in others a single container may utilize a single storage volume. An application or application bundle may use both persistent and ephemeral storage volumes for different purposes.

The storage node 116 may be a local storage device, a remote device on a network, or some other type of device with the ability to provide storage resources (for example, disks) to a cluster. The storage node 116 may be a device of an NVME, NVMHCIS, or other suitable type of device. In some implementations, storage resources may be in high demand and short supply. A user may have a need for such resources for other contexts and may prefer that storage be available as soon as it is not being utilized by another application. Thus, once an application stops, all the temporary storage it has been using may be freed up and made available for other applications to use.

When creating an application, there may be an option of adding one or more ephemeral volumes for each role defined in a manifest file 702. In some implementations, required ephemeral volumes may already be specified within the manifest file 702, in which case the ephemeral volumes section may automatically appear populated with preconfigured ephemeral volumes. However, these can be modified to suit any needs of the application deployment at runtime. In other implementations, if no ephemeral volumes have been specified within the manifest file 702, a user may need to configure one or more options within the manifest file 702. These options may be edited or configured to a user's specification and the respective ephemeral volume(s) may then be configured in order for them to be provisioned alongside the application.

Manifest file 702 configurations may describe storage type, media format, file path, size, and other characteristics. In addition, they can also be specified at runtime via an input file, which may be a YAML file in some implementations while in others an alternate object notation or markup language format may be used, such as JSON or XML. Configuration parameters for an input file may include application name, resource pool, resource groups, snapshot schedules, replication factor, restart count for restart attempts, and more. The variety of potential configuration parameters may vary depending on the nature of the application to which the configuration file applies. The input file may be used to customize a template off of which an application may be based.

Ephemeral volumes may not be included in application snapshots and/or backups in some implementations. They may be included in the application spec that is part of the metadata captured with each snapshot and backup. New storage volumes may be created for each configured application ephemeral volume when creating a clone of an application from an application snapshot, or a new applications from an application backup. When creating a clone or new application from a snapshot or backup that contains an ephemeral volume, a user may consider specific tagging of disks for storage. This is because there may need to be an adequate number of disks available that not only match the tag specified but also satisfy the storage space requirement for the new AEVs. If this is not the case, the tag specified may need to be modified or removed entirely before deploying the new application instance. Both AEVs 612 and persistent storage volumes 608, 610 may be provided by the same storage provider 614 in some implementations, or from different storage providers in others.

FIG. 8 is a schematic illustration of a disabled bundle application 800 within a cluster. An application 602 may be disabled because of a temporary restart, because it was shut down, because of a failure, because it was stopped, or other similar reasons. While an application 602 is in a powered down state 802, any ephemeral storage volume may be deleted, freeing up the storage resources for use by other nodes or services running in the cluster. If an application is stopped or deleted the storage space used by an application ephemeral volume may be reclaimed such that it can be used by other applications on the cluster. On the other hand, when an application is restarted the requested ephemeral volumes may be provisioned again in a way similar to how that storage was initially provisioned in some implementations, while options for other provisioning methods may be utilized in other implementations. In some implementations, any data on that storage volume may additionally be deleted and not retained elsewhere within the cluster. In other implementations metadata pertaining to information about the ephemeral storage volume may be preserved and backed up somewhere on the cluster or to an external repository.

Figure 9A:
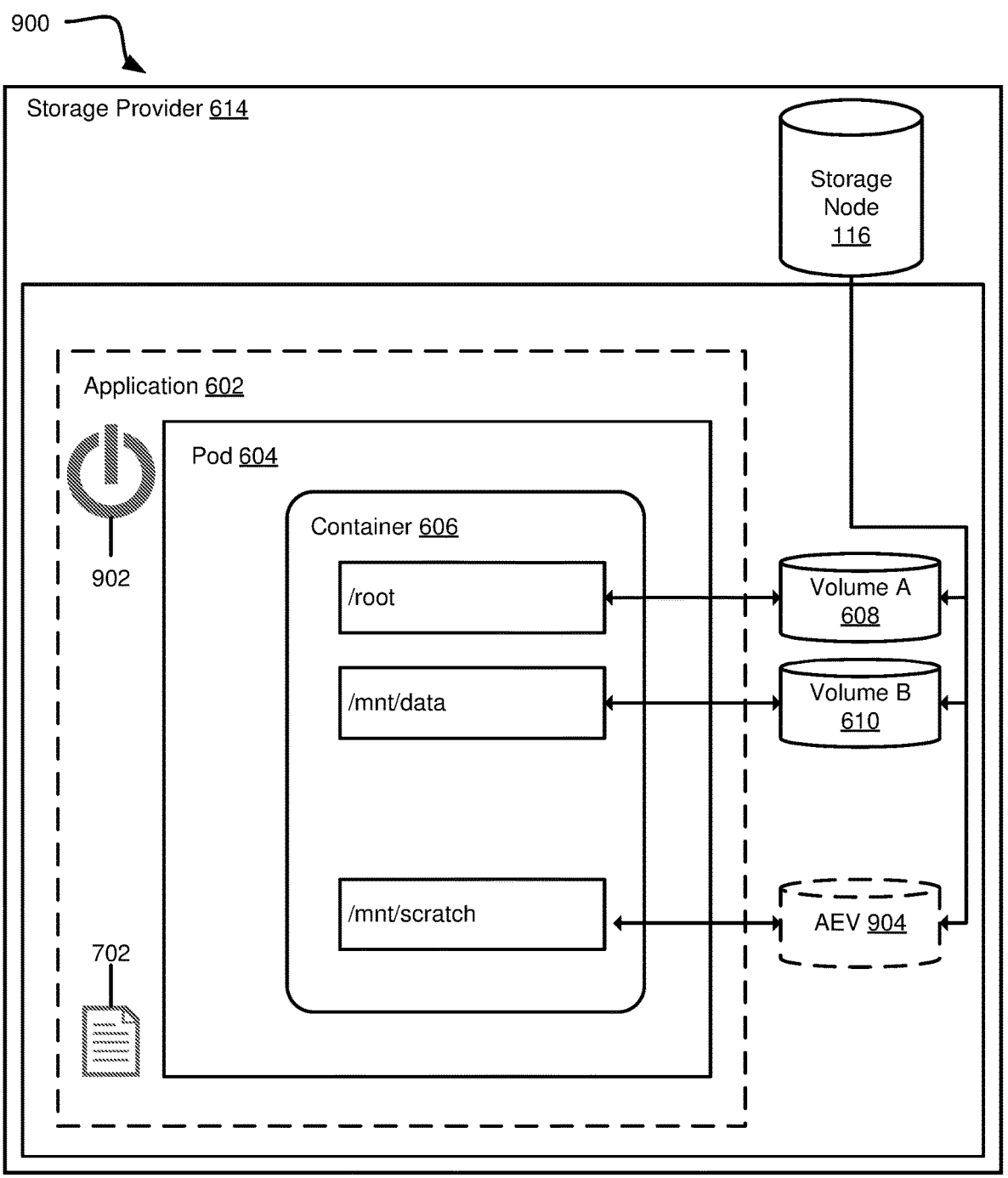
FIG. 9A is a schematic block diagram illustrating a deployed application in a powered-on state and mounting a new application ephemeral volume as defined by a manifest file.

FIG. 9A is a schematic illustration of an application bundle 900 having a powered on state. An application 602 may have powered on following a successful restart, because it was deployed for the first time, resuming from a stopped state, or for another similar reason. Once powered on 902 the application 602 may still need temporary storage to perform its functions. An application 602 may specify characteristics for needed storage after a restart within a manifest file 702. These characteristics may be used to request creation of a new AEV 904 to then be mounted to the application 602 at a mount point specified within the manifest file 702. If the application 602 powered on following a restart or recovery, the application 602 may be configured to automatically request a new AEV 904 according to configurations in the manifest file 702 in some implementations. In other implementations, the application 602 may require a user to manually request a new storage volume, which may also be indicated as ephemeral or another format as specified.

Figure 9B:
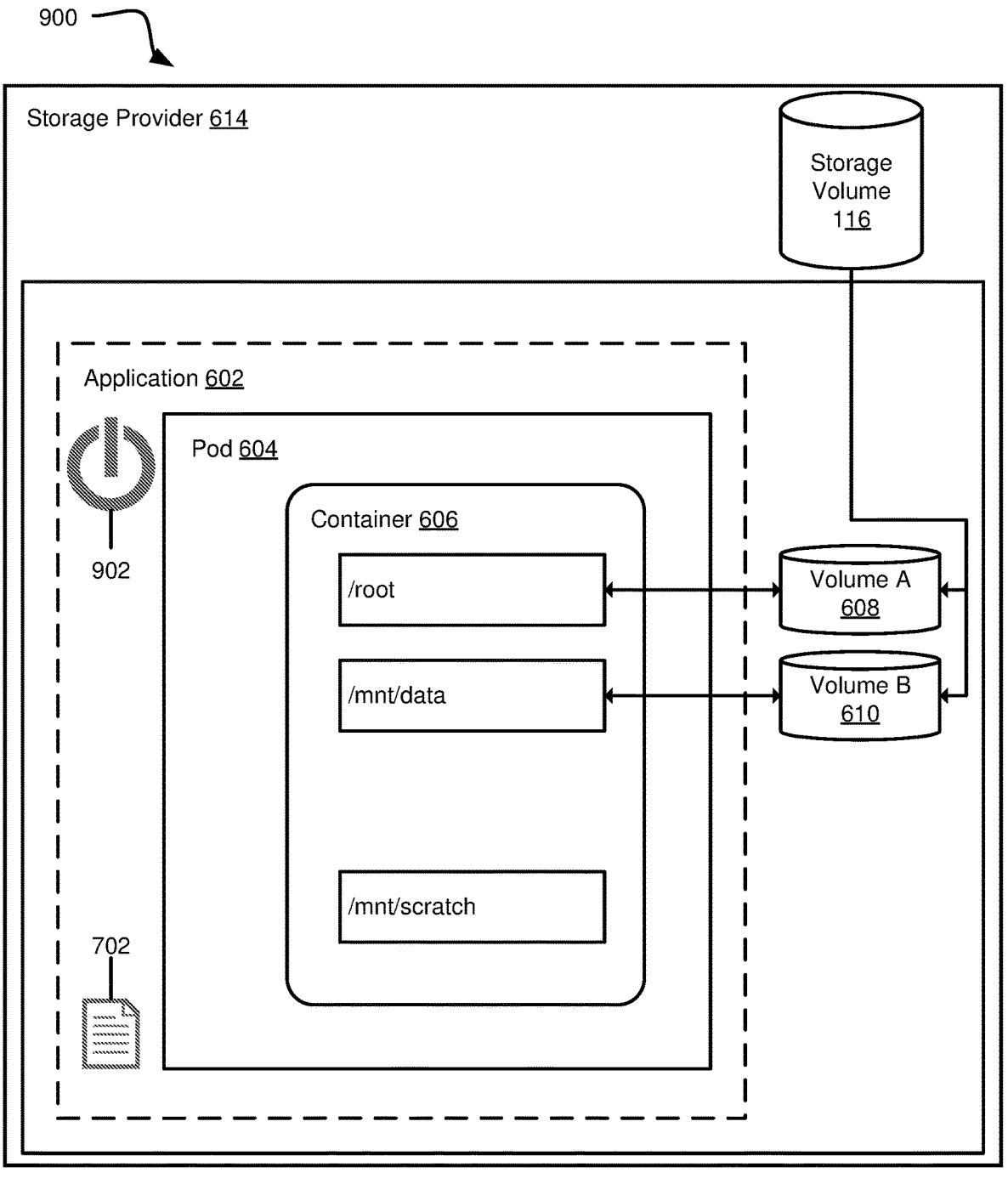
FIG. 9B is a schematic block diagram illustrating a deployed application in a powered-on state unable to mount a new application ephemeral volume due to a lack of sufficient storage volume.

In some cluster configurations storage may be finite and thus the application 602 may try to request some amount of storage greater than the amount of storage available, as shown in FIG. 9B. In these instances, an application 602 may not be able to restart if there is not be enough storage space available to satisfy the AEV requirements. In some implementations a user may configure an application to periodically try to retry the request until the request succeeds. In others, a user may prefer to manually restart the application and request the storage provisioning at a later, specified time. In some implementations, a cluster may handle the situation by providing some amount of what storage is available to the application 602 if the application 602 is so configured. In other implementations, a storage provider 614 may simply not provide storage at all if there are not enough storage resources available in any existing storage nodes 116. A user may or may not be notified that an application bundle 602 has failed to request a new storage volume depending on a cluster configuration.

Figure 10:
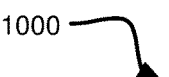
FIG. 10 is a schematic block diagram showing a user interface whereby a user can manually create an application ephemeral volume for a deployed application.
Figure 10:
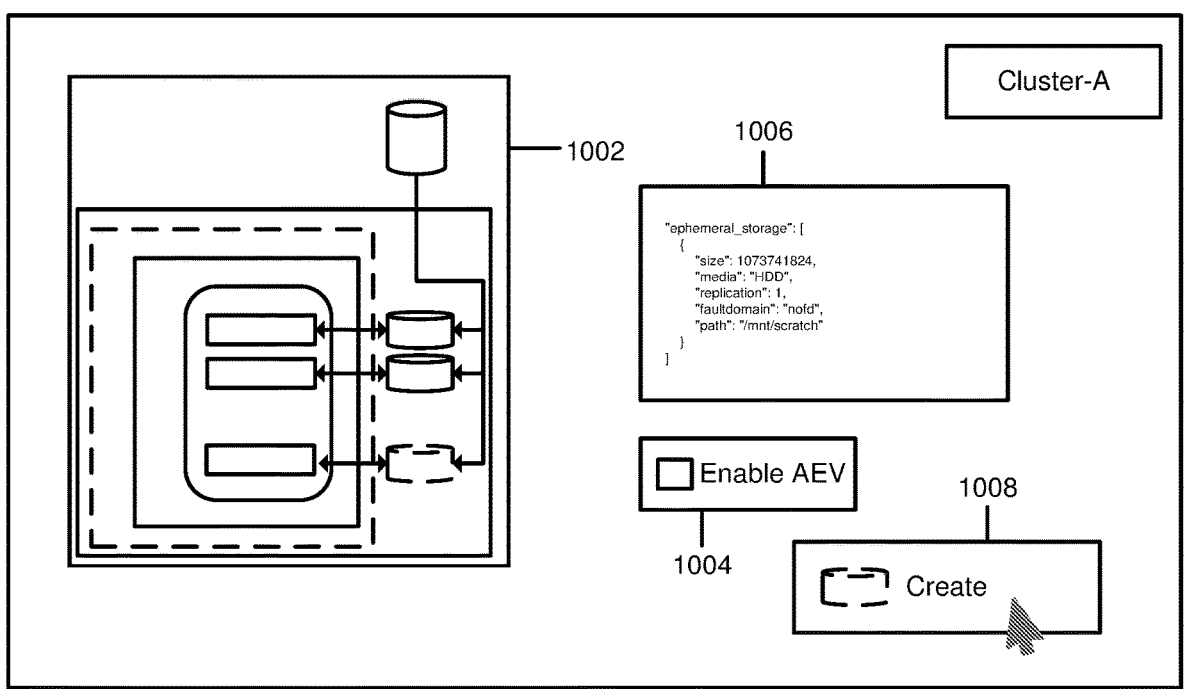

FIG. 10 shows an exemplary user interface (UI) for creating application ephemeral volumes manually by user input. A UI may have a display 1002 showing a specified application deployed to a cluster. A user may use the UI to specify AEVs for each vnode described in an application's manifest file. A user may utilize the UI to edit configurations for an AEV mounted to an application at runtime. A user may also utilize a UI to create AEVs if the selected application was not deployed with a configuration to create an AEV. In these instances, a user may select an option 1004 to enable ephemeral volume storage for the selected application. Once enabled, a user may use an input window 1006 to enter specifications for a desired AEV. In instances where a selected application already has a manifest file or other configuration file defining AEV characteristics, an input window 1006 may instead display the contents of that manifest file.

Figure 11:
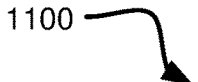
FIG. 11 is a schematic diagram illustrating an exemplary manifest file entry defining an application ephemeral volume.

FIG. 11 shows an exemplary ephemeral storage entry 1100 from an application bundle manifest file containing a number of configuration options to define an AEV. Such configuration options may include but are not limited to: "size" to define the size of the ephemeral volume needed by an application, "media" to specify a media type such as SSD or HDD. Configuration options may additionally include "replication" to define how many copies of an AEV an application might need. "faultdomain" to specify the fault domain (disk, host, or rack) for replica volumes when "replication" is set to two volumes or above. Options may additionally include "path" to describe a path in a container to which an AEV should mount.

Figure 12:
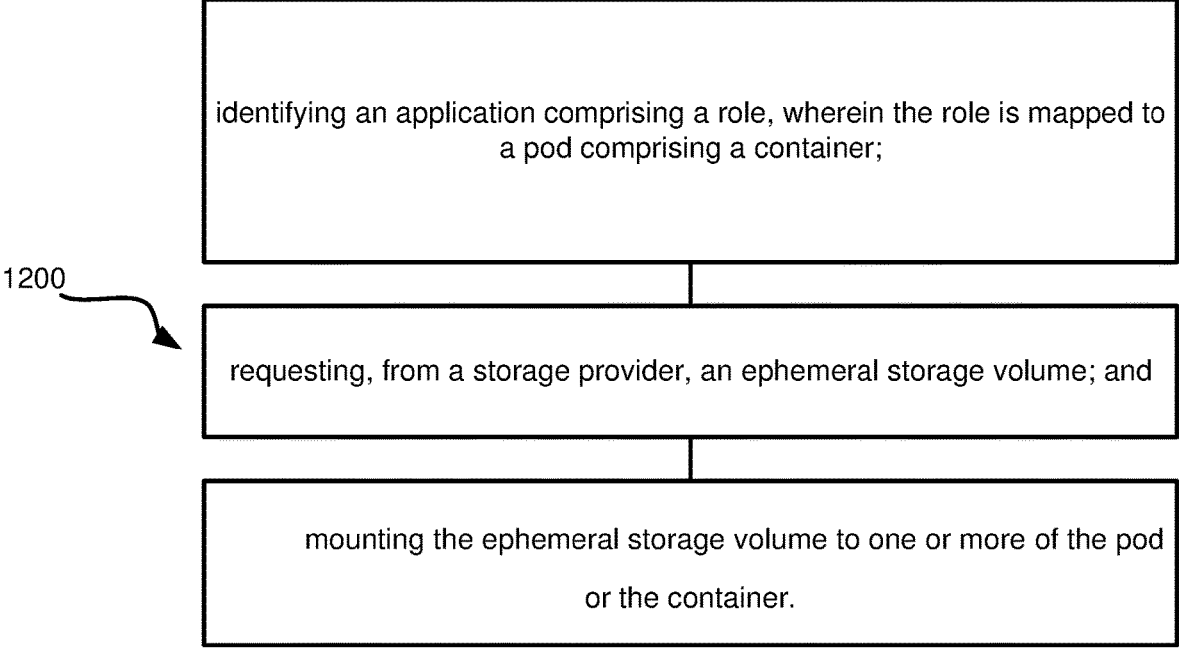
FIG. 12 is a schematic block diagram illustrating a flowchart method describing a software method for creating an ephemeral storage volume.

FIG. 12 is an illustration of a flowchart of a method for deploying an application bundle and requesting an ephemeral storage volume. The method may include identifying an application comprising a role, wherein the role is mapped to a pod comprising a container, requesting, from a storage provider, an ephemeral storage volume, and mounting the ephemeral storage volume to one or more of the pod or the container.

Figure 13:
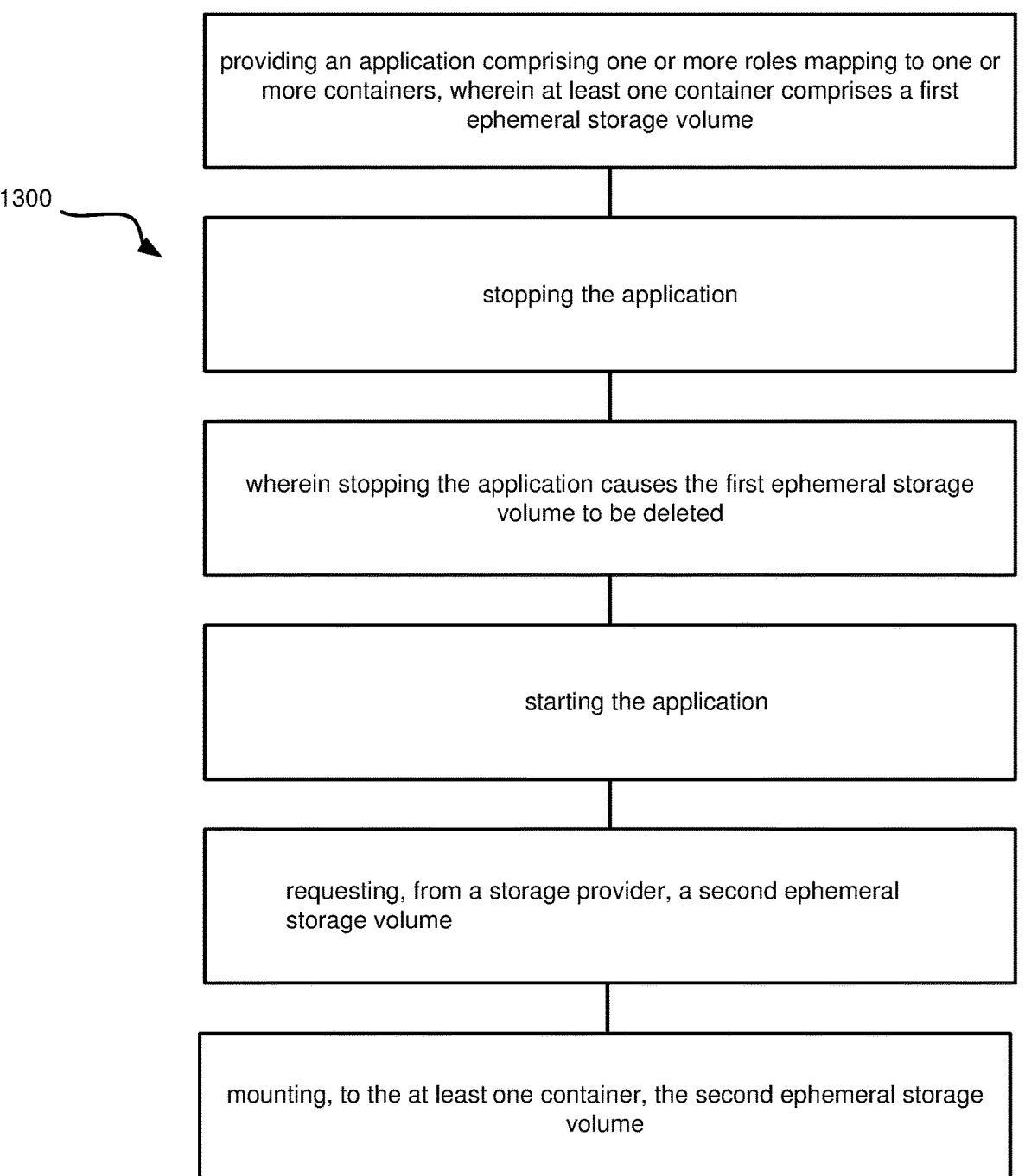
FIG. 13 is a schematic block diagram illustrating a flowchart method describing a software method for restarting an application and creating an ephemeral storage volume.

FIG. 13 is an illustration of a flowchart of a method for attaching and mounting an ephemeral storage volume to provide storage to one or more containers specified as vnodes within the application bundle following a restart or powering down. The method may include providing an application comprising one or more roles mapping to one or more containers, wherein at least one container comprises a first ephemeral storage volume, stopping the application, wherein stopping the application causes the first ephemeral storage volume to be deleted, starting the application, requesting, from a storage provider, a second ephemeral storage volume, and mounting, to the at least one container, the second ephemeral storage volume.

Figure 14:
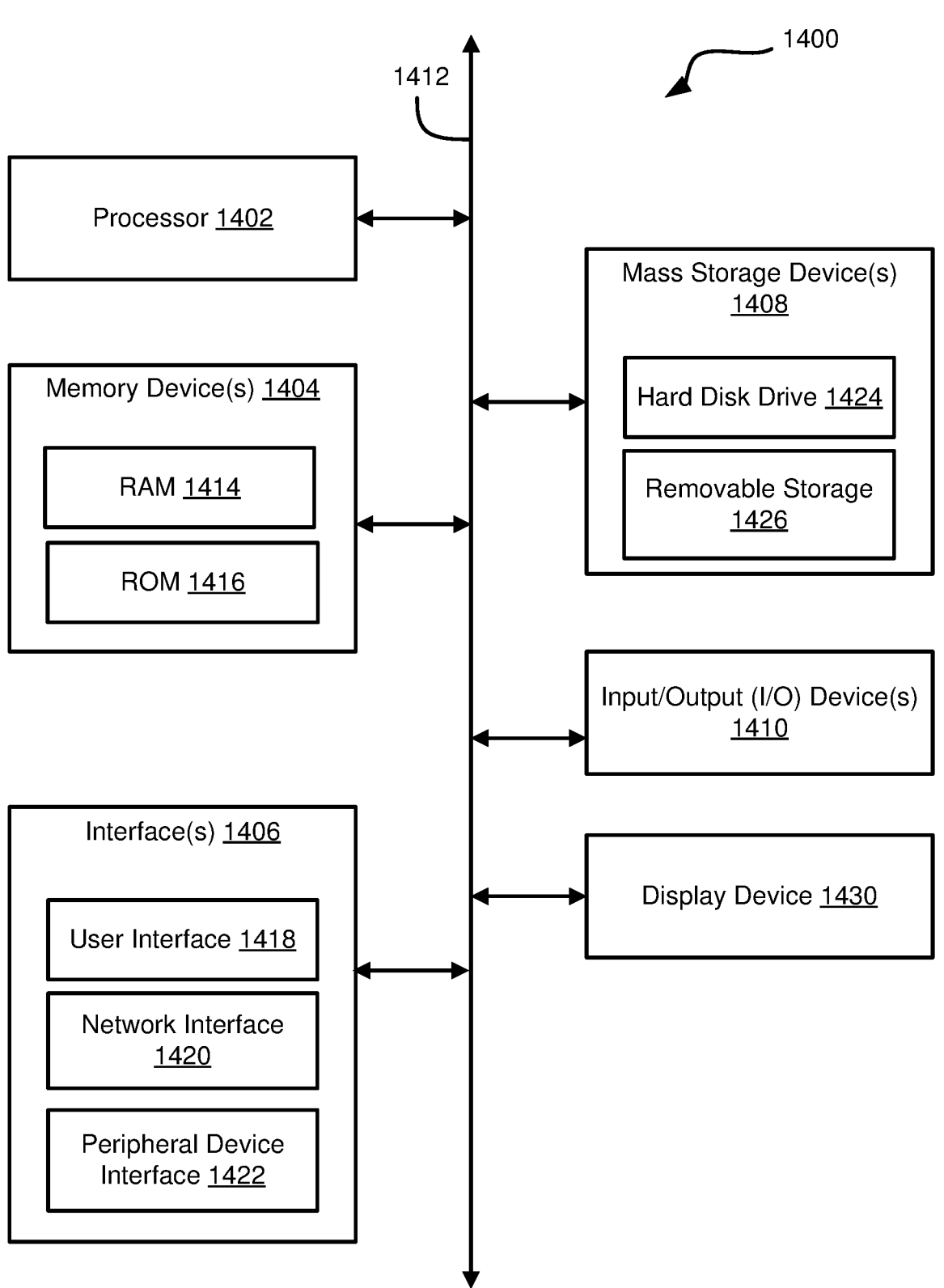
FIG. 14 is a schematic block diagram of an example computing device.

FIG. 14 illustrates a schematic block diagram of an example computing device 1400. The computing device 1400 may be used to perform various procedures, such as those discussed herein. The computing device 1400 can perform various monitoring functions as discussed herein, and can execute one or more application programs, such as the application programs or functionality described herein. The computing device 1400 can be any of a wide variety of computing devices, such as a desktop computer, in-dash computer, vehicle control system, a notebook computer, a server computer, a handheld computer, tablet computer and the like.

The computing device 1400 includes one or more processor(s) 1404, one or more memory device(s) 1404, one or more interface(s) 1406, one or more mass storage device(s) 1408, one or more Input/output (I/O) device(s) 1410, and a display device 1430 all of which are coupled to a bus 1412. Processor(s) 1404 include one or more processors or controllers that execute instructions stored in memory device(s) 1404 and/or mass storage device(s) 1408. Processor(s) 1304 may also include several types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 13, a particular mass storage device 1408 is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 may include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, or any suitable user interface now known to those of ordinary skill in the field, or later discovered), keyboards, and the like.

Bus 1412 allows processor(s) 1404, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE bus, USB bus, and so forth.

For purposes of illustration, programs and other executable program components are shown herein as discrete blocks, such as block 1402 for example, although it is understood that such programs and components may reside at various times in different storage components of computing device 1400 and are executed by processor(s) 1402. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

EXAMPLES

The following examples pertain to further embodiments.

Example 1 is a method. The method includes identifying an application comprising a role, wherein the role is mapped to a pod comprising a container. The method includes requesting, from a storage provider, an ephemeral storage volume. The method includes mounting the ephemeral storage volume to the one or more of the pod or container.

Example 2 is a method according to Example 1, wherein the application is an application bundle comprising a manifest file, the role, and a vnode associated with the role, wherein the vnode specifies resources for the role, and wherein the specified resources comprise one or more of memory resources supporting the role, compute resources for executing the role, physical volumes accessible by the role, persistent data volumes accessible by the role, or ephemeral data volumes accessible by the role.

Example 3 is a method according to Example 1 or 2, further comprising mounting the ephemeral storage volume to the application bundle.

Example 4 is a method according to any of Examples 1-3, wherein the application comprises a plurality of roles, and wherein each of the plurality of roles is mapped to a unique pod, and wherein each of the unique pods comprises one or more containers.

Example 5 is a method according to any of Examples 1-4, further comprising deleting the ephemeral storage volume when the application stops.

Example 6 is a method according to any of Examples 1-5, further comprising starting the application and automatically requesting, from the storage provider, a new ephemeral storage volume according to a configuration defined in the manifest file.

Example 7 is a method according to any of Examples 1-6, further comprising starting the application and wherein a user manually requests, from the storage provider, a new ephemeral storage volume via a user interface according to a new configuration input by the user.

Example 8 is a method according to any of Examples 1-7, wherein the storage provider cannot create the new ephemeral storage volume, and wherein the application periodically requests the new ephemeral storage volume until the storage provider can create the new storage volume.

Example 9 is a method according to any of Examples 1-8, wherein the storage provider cannot create the new ephemeral storage volume, and wherein the user manually requests the new ephemeral storage volume via a user interface.

Example 10 is a method according of any of Examples 1-9, wherein the application is deployed in association with a cluster comprising a control plane node, an Application Program Interface (API) server in communication with one or more compute nodes, wherein the API server is executed by the control plane node, a controller manager in communication with the API server, wherein the controller manager is executed by the control plane node, and one or more compute nodes in communication with the control plane node by way of the API server.

Example 11 is a method according to any of Examples 1-10, wherein mounting the ephemeral storage volume to the one or more of the pod or the container comprises amending a volume list within a specification for the one or more of the pod or the container to comprise a name of the ephemeral storage volume, and amending a volume mounts entry within the one or more of the pod or the container to indicate where the ephemeral storage volume will be mounted.

Example 12 is a system, comprising a processor and a computer-readable storage medium having programming instructions thereon that when executed cause the processor to identify an application comprising a role, wherein the role is mapped to a pod comprising a container, request, from a storage provider, an ephemeral storage volume, and mount the ephemeral storage volume to the one or more of the pod or the container.

Example 13 is a system according to Example 12, wherein the application is an application bundle comprising a manifest file, the role, and a vnode associated with the role, wherein the vnode specifies resources for the role, and wherein the specified resources comprise one or more of memory resources supporting the role, compute resources for executing the role, physical volumes accessible by the role, persistent data volumes accessible by the role, or ephemeral data volumes accessible by the role.

Example 14 is a system according to Example 12 or 13, wherein the programming instructions are further configured to mount the ephemeral storage volume to the bundle application.

Example 15 is a system according to any of Examples 12-14, wherein the application comprises a plurality of roles, and wherein each of the plurality of roles is mapped to a unique pod, and wherein each of the unique pods comprises one or more containers.

Example 16 is a system according to any of Examples 12-15, wherein the programming instructions are further configured to delete the ephemeral storage volume when the application stops.

Example 17 is a system according to any of Examples 12-16, wherein the programming instructions are further configured to start the application and automatically request, from the storage provider, a new ephemeral storage volume according to a configuration defined in the manifest file.

Example 18 is a system according to any of Examples 12-17, wherein the programming instructions are further configured to start the application and wherein a user manually requests, from the storage provider, a new ephemeral storage volume via a user interface according to a new configuration input by the user.

Example 19 is a system according to any of Examples 12-18, wherein the storage provider cannot create the new ephemeral storage volume, and wherein the programming instructions are further configured to cause the application to periodically request the new ephemeral storage volume until the storage provider can create the new storage volume.

Example 20 is a system according to any of Examples 12-19, wherein the storage provider cannot create the new ephemeral storage volume, and wherein the user manually requests the new ephemeral storage volume via a user interface.

Example 21 is a system according to any of Examples 12-20, wherein the application is deployed in association with a cluster comprising a control plane node, an Application Program Interface (API) server in communication with one or more compute nodes, wherein the API server is executed by the control plane node, a controller manager in communication with the API server, wherein the controller manager is executed by the control plane node, and one or more compute nodes in communication with the control plane node by way of the API server.

Example 22 is a system according to any of Examples 12-21, wherein mounting the ephemeral storage volume to the one or more of the pod or the container comprises amending a volume list within a specification for the one or more of the pod or the container to comprise a name of the ephemeral storage volume, amending a volume mounts entry within the one or more of the pod or the container to indicate where the ephemeral storage volume will be mounted.

Example 23 is a method. The method includes providing an application comprising one or more containers, wherein at least one container comprises a first ephemeral storage volume. The method includes stopping the application, wherein stopping the application causes the first ephemeral storage volume to be deleted. The method includes starting the application. The method includes requesting, from a storage provider, a second ephemeral storage volume. The method includes mounting, to the at least one container, the second ephemeral storage volume.

Example 24 is a method according to Example 23, further comprising wherein the application state remains in a powered down state when a new non-persistent storage volume is not available, and wherein the application periodically requests, from the storage provider, a second non-persistent storage volume.

What is claimed is:

1. A method comprising:
   identifying, by a computing device, an application comprising a role, wherein the role is mapped to a pod comprising a container;

requesting, by the computing device, from a storage provider, an ephemeral storage volume; and mounting, by the computing device, the ephemeral storage volume to one or more of the pod or the container;

wherein the application is an application bundle comprising:

a manifest file, the role, and a vnode associated with the role, wherein the vnode specifies resources for the role, and wherein the specified resources comprise one or more of memory resources supporting the role, compute resources for executing the role, physical volumes accessible by the role, or persistent data volumes accessible by the role, or ephemeral data volumes accessible by the role;

wherein the method further comprises starting the application and automatically requesting, from the storage provider, a new ephemeral storage volume according to a configuration defined in the manifest file;

wherein the method further comprises when the storage provider does not have enough storage space to create the new ephemeral storage volume, periodically requesting, by the application, the new ephemeral storage volume until the storage provider can create the new ephemeral storage volume.

2. The method of claim 1, further comprising mounting the ephemeral storage volume to the application.

3. The method of claim 1, wherein the application comprises a plurality of roles, and wherein each of the plurality of roles is mapped to a unique pod, and wherein each of the unique pods comprises one or more containers.

4. The method of claim 1, further comprising deleting the ephemeral storage volume when the application stops.

5. The method of claim 1, further comprising starting the application and wherein a user manually requests, from the storage provider, the new ephemeral storage volume via a user interface according to a new configuration input by the user.

6. The method of claim 1, wherein the storage provider cannot create the new ephemeral storage volume, and wherein a user manually requests the new ephemeral storage volume via a user interface.

7. The method of claim 1, wherein the application is deployed in association with a cluster comprising:

a control plane node;

an Application Program Interface (API) server in communication with one or more compute nodes, wherein the API server is executed by the control plane node;

a controller manager in communication with the API server, wherein the controller manager is executed by the control plane node; and the one or more compute nodes in communication with the control plane node by way of the API server.

8. The method of claim 1, wherein mounting the ephemeral storage volume to the one or more of the pod or the container comprises:

amending a volume list within a specification for the one or more of the pod or the container to comprise a name of the ephemeral storage volume; and amending a volume mounts entry within the one or more of the pod or the container to indicate where the ephemeral storage volume will be mounted.

9. A system, comprising:

a processor and a computer-readable storage medium having programming instructions thereon that when executed cause the processor to:

identify an application comprising a role, wherein the role is mapped to a pod comprising a container;

request, from a storage provider, an ephemeral storage volume;

when the storage provider does not have enough storage space to create the ephemeral storage volume, execute the application, wherein the application periodically requests the ephemeral storage volume until the storage provider can create the ephemeral storage volume; and mount the ephemeral storage volume to one or more of the pod or the container.

10. The system of claim 9, wherein the application is an application bundle comprising:

a manifest file, the role, and a vnode associated with the role, wherein the vnode specifies resources for the role, and wherein the specified resources comprise one or more of memory resources supporting the role, compute resources for executing the role, physical volumes accessible by the role, persistent data volumes accessible by the role, or ephemeral data volumes accessible by the role.

11. The system of claim 10, wherein the programming instructions are further configured to start the application and automatically request, from the storage provider, a new ephemeral storage volume according to a configuration defined in the manifest file.

12. The system of claim 9, wherein the application comprises a plurality of roles, and wherein each of the plurality of roles is mapped to a unique pod, and wherein each of the unique pods comprises one or more containers.

13. The system of claim 9, wherein the programming instructions are further configured to delete the ephemeral storage volume when the application stops.

14. The system of claim 9, wherein the programming instructions are further configured to start the application and receive a manual user request for a new ephemeral storage volume via a user interface according to a new configuration input by a user.

15. A method comprising:

providing an application comprising one or more roles mapping to one or more containers, wherein at least one container comprises a first ephemeral storage volume;

stopping the application;

wherein stopping the application causes the first ephemeral storage volume to be deleted;

starting the application;

requesting, from a storage provider, a second ephemeral storage volume; and when the storage provider does not have enough storage space to create the second ephemeral storage volume, execute the application, wherein the application periodically requests the second ephemeral storage volume until the storage provider can create the second ephemeral storage volume; and mounting, to the at least one container, the second ephemeral storage volume.

* * * * *